United States Patent
Lee et al.

(10) Patent No.: US 9,244,619 B2
(45) Date of Patent: Jan. 26, 2016

(54) METHOD OF MANAGING DATA STORAGE DEVICE AND DATA STORAGE DEVICE

(71) Applicant: SAMSUNG ELECTRONICS CO., LTD., Suwon-si, Gyeonggi-do (KR)

(72) Inventors: Seh-Wan Lee, Seoul (KR); Jae-Geuk Kim, Hwaseong-si (KR); Joo-Young Hwang, Suwon-si (KR)

(73) Assignee: Samsung Electronics Co., Ltd., Suwon-si, Gyeonggi-do (KR)

(*) Notice: Subject to any disclaimer, the term of this patent is extended or adjusted under 35 U.S.C. 154(b) by 43 days.

(21) Appl. No.: 14/037,676

(22) Filed: Sep. 26, 2013

(65) Prior Publication Data

US 2014/0101373 A1    Apr. 10, 2014

(30) Foreign Application Priority Data

Sep. 27, 2012  (KR) ........................ 10-2012-0107762

(51) Int. Cl.
- G06F 13/12 (2006.01)
- G06F 3/06 (2006.01)
- G06F 13/38 (2006.01)

(52) U.S. Cl.
CPC ............ *G06F 3/0613* (2013.01); *G06F 3/0655* (2013.01); *G06F 3/0659* (2013.01); *G06F 3/0679* (2013.01); *G06F 13/385* (2013.01)

(58) Field of Classification Search
None
See application file for complete search history.

(56) References Cited

U.S. PATENT DOCUMENTS

| | | | |
|---|---|---|---|
| 6,535,949 B1 | 3/2003 | Parker | |
| 7,599,973 B2 | 10/2009 | Detlefs et al. | |
| 7,680,837 B2 | 3/2010 | Yamato | |
| 7,890,550 B2 | 2/2011 | Jung et al. | |
| 7,996,642 B1 * | 8/2011 | Smith | 711/167 |
| 2008/0109590 A1 * | 5/2008 | Jung et al. | 711/103 |
| 2008/0235306 A1 | 9/2008 | Kim et al. | |
| 2010/0082886 A1 * | 4/2010 | Kwon et al. | 711/103 |
| 2011/0099323 A1 | 4/2011 | Syu | |
| 2011/0264870 A1 * | 10/2011 | Ylonen | 711/154 |
| 2012/0124276 A1 * | 5/2012 | Ahn et al. | 711/103 |
| 2012/0151124 A1 * | 6/2012 | Baek et al. | 711/103 |
| 2012/0166712 A1 * | 6/2012 | Lary | 711/103 |
| 2012/0284459 A1 * | 11/2012 | Gill | 711/113 |
| 2013/0073789 A1 * | 3/2013 | Khmelnitsky et al. | 711/103 |
| 2014/0013032 A1 * | 1/2014 | Min et al. | 711/103 |
| 2014/0115241 A1 * | 4/2014 | Wei | 711/103 |

FOREIGN PATENT DOCUMENTS

| | | |
|---|---|---|
| JP | 2002278828 | 9/2002 |
| KR | 0987251 | 10/2010 |
| KR | 1017067 | 2/2011 |
| KR | 1067018 A | 9/2011 |

\* cited by examiner

*Primary Examiner* — Henry Tsai
*Assistant Examiner* — Aurangzeb Hassan
(74) *Attorney, Agent, or Firm* — Volentine & Whitt, PLLC

(57) ABSTRACT

A method of managing a data storage device including a memory controller and a memory device includes: calculating a first sequential and consecutive write cost (SCWC) according to a garbage collection (GC) write operation policy, a second SCWC according to a slack space recycling (SSR) write operation policy and a third SCWC according to an in-place updating (IPU) write operation policy respectively, in response to a write request in the memory controller; determining a write operation policy which has a minimum cost of the first through third SCWCs; and writing data in a selected segment in the memory device according to the determined write operation policy.

17 Claims, 14 Drawing Sheets

FIG. 3

| SEQUENTIAL WRITE UNIT | VPSRT | VPSWT | IPSWT | MDRT | MDWT |
|---|---|---|---|---|---|
| 1PAGE 2KB | TRV(1) | TWV(1) | TWIV(1) | TMR(1) | TMW(1) |
| 2PAGE 4KB | TRV(2) | TWV(2) | TWIV(2) | TMR(2) | TMW(2) |
| 4PAGE 8KB | TRV(4) | TWV(4) | TWIV(4) | TMR(4) | TMW(4) |
| 8PAGE 16KB | TRV(8) | TWV(8) | TWIV(8) | TMR(8) | TMW(8) |
| 16PAGE 32KB | TRV(16) | TWV(16) | TWIV(16) | TMR(16) | TMW(16) |
| 32PAGE 64KB | TRV(32) | TWV(32) | TWIV(32) | TMR(32) | TMW(32) |

METHOD OF MANAGING DATA STORAGE DEVICE AND DATA STORAGE DEVICE

CROSS-REFERENCE TO RELATED APPLICATION

This application claims priority under 35 USC §119 to Korean Patent Application No. 10-2012-0107762, filed on Sep. 27, 2012, the subject matter of which is hereby incorporated by reference.

BACKGROUND

The inventive concept relates to data storage devices, and more particularly, to a method of managing data storage devices.

In general, in a log-based data storage device, a total volume that is partitioned is considered as one big log, and data is sequentially stored in the volume according to physical orderings without regard to logical block numbers of the volume for enhancing performance of random small write operation in response to write requests.

However, when repeated write requests are issued on a same logical space, the data previously stored in the same logical space is not valid and a garbage collection (GC) operation is required in a file system. In this case, a cost of the GC operation rapidly increases as utilization of partitions increases.

In a flash-based solid-state drive (SSD), performance of the GC operation is dependent on the sequentiality or randomness of valid pages. When a same amount of data is written, the throughput of a sequential write operation is higher than the throughput of a random write operation.

SUMMARY

Exemplary embodiments provide a method of managing a data storage device capable of dynamically determining write operation policy considering sequentiality of storage space with minimum cost.

Exemplary embodiments provide a data storage device capable of dynamically determining write operation policy considering sequentiality of storage space with minimum cost.

Accordingly to exemplary embodiments, the inventive concept provides a method of managing a data storage device including a memory controller and a memory device. The method includes calculating a first sequential and consecutive write cost (SCWC) according to a garbage collection (GC) write operation policy, calculating a second SCWC according to a slack space recycling (SSR) write operation policy, and calculating a third SCWC according to an in-place updating (IPU) write operation policy, for a write request received by the data storage device. The method further includes determining a write operation policy which has a lowest cost among the first through third SCWCs; and writing data in a selected segment in the memory device according to the determined write operation policy.

In an exemplary embodiment, calculating the first SCWC may include calculating a valid page consecutive read time for each of one or more consecutive valid page cluster in the selected segment to calculate a segment valid page read time corresponding to a sum of the valid page consecutive read times; calculating a first consecutive write time for all valid pages in the selected segment; calculating a second consecutive write time for all invalid pages in the selected segment; calculating a meta data read time for all of the valid pages in the selected segment; calculating a meta data write time for all of the valid pages and the invalid pages in the selected segment; and determining a sum of the segment valid page read time, the first consecutive write time, the second consecutive write time, the meta data read time and the meta data write time as the first SCWC.

The valid page read times and/or the first and second consecutive write times may be calculated by referring to a device performance table storing a plurality of consecutive read times and a plurality of consecutive write times which are measured per a consecutive unit storage space.

A consecutive read time and/or a consecutive read time which is not included in the device performance table may be calculated by interpolating between adjacent consecutive read times or consecutive write times, respectively, included in the device performance table.

The device performance table may be filled by performing a device performance measuring algorithm when a storage space in the memory device is formatted and the filled device performance table is stored in a super block in the storage space.

In an exemplary embodiment, calculating the second SCWC may include calculating an invalid page consecutive write time for each of one or more consecutive invalid page cluster in the selected segment to calculate a segment slack space write time corresponding to a sum of the invalid page consecutive write times; calculating a segment slack space meta data write time corresponding to a meta data write time for all of invalid pages in the selected segment; and determining a sum of the segment slack space write time and the segment slack space meta data write time as the second SCWC.

In an exemplary embodiment, calculating the third SCWC may include determining a sum of write times of each unit page of all invalid pages in the selected segment as the third SCWC.

In an exemplary embodiment, the selected segment may be selected by selecting at least one segment having a minimum valid space among a plurality of used segments of the memory device, and when the at least one segment includes a plurality of segments, selecting as the selected segment a segment among the plurality of used segments having the minimum valid space which also has a largest consecutive invalid space.

Accordingly to some exemplary embodiments, the inventive concept provides a data storage device including a memory device and a memory controller that controls the memory device. The memory controller includes a processor having a write operation module configured to perform a sequential and consecutive write operation when data is written in a selected segment in the memory device. The write operation module includes a garbage collection (GC) cost calculation module configured to calculate a first sequential and consecutive write cost (SCWC) according to a GC write operation policy; a slack space recycling (SSR) cost calculation module configured to calculate a second SCWC according to a SSR write operation policy; and an in-place updating (IPU) cost calculation module configured to calculate a third SCWC according to an IPU write operation policy. The processor writes data in the selected segment according to a write operation policy which has a minimum cost of the first through third SCWCs.

In an exemplary embodiment, the GC cost calculation module may be configured to calculate a valid page consecutive read time for each of one or more consecutive valid page clusters in the selected segment to calculate a segment valid page read time corresponding to a sum of the valid page consecutive read times, configured to calculate a first consecutive write time for all valid pages in the selected segment, configured to calculate a second consecutive write time for all invalid pages in the selected segment, configured to calculate a meta data read time for all of the valid pages in the selected segment, configured to calculate a meta data write time for all of the valid pages and the invalid pages in the selected segment and configured to determine a sum of the segment valid page read time, the first consecutive write time, the second consecutive write time, the meta data read time and the meta data write time as the first SCWC.

The memory controller may further include a memory that includes a device performance table storing a plurality of consecutive read times and a plurality of consecutive write times which are measured per a consecutive unit storage space and the write operation module is configured to calculate the valid page consecutive read times and/or the first and second consecutive write times by referring to the device performance table.

The write operation module may calculate a consecutive read time and/or a consecutive read time which is not included in the device performance table by interpolating between adjacent consecutive read times or consecutive write times, respectively, included in the device performance table.

In an exemplary embodiment, the SSR cost calculation module may be: configured to calculate an invalid page consecutive write time for one or more consecutive invalid page clusters in the selected segment to calculate a segment slack space write time corresponding to a sum of the invalid page consecutive write times; configured to calculate a segment slack space meta data write time corresponding to a meta data write time for all invalid pages in the selected segment; and configured to determine a sum of the segment slack space write time and the segment slack space meta data write time as the second SCWC.

In an exemplary embodiment, the IPU cost calculation module may be configured to determine a sum of write times of each unit page of all invalid pages in the selected segment as the third SCWC.

In an exemplary embodiment, the processor may further include a victim selection module configured to select at least one segment having a minimum valid space among a plurality of used segments of the memory device, and further configured to select as the selected segment, when the at least one segment includes a plurality of segments, a segment among the plurality of used segments having the minimum valid space which also has a largest consecutive invalid space.

According to some exemplary embodiments, the inventive concept provides a method of operation of a data storage device including a memory device and a memory controller. The method includes: receiving a write request at the data storage device; determining whether a free segment exists in the memory device; when a free segment does not exist in the memory device, selecting a victim segment in the memory device; determining a first sequential and consecutive write cost (SCWC) corresponding to writing data to the selected victim segment according to a first write operation policy; determining a second SCWC corresponding to writing the data to the selected victim segment according to a second write operation policy which is different from the first write operation policy; determining a third SCWC corresponding to writing the data to the selected victim segment according to a third write operation policy which is different from the first and second write operation policies; selecting a write operation policy among the first, second, and third write operation policies which has a lowest corresponding cost among first through third SCWCs; and writing the data to the selected memory segment in the memory device via the memory controller according to the selected write operation policy.

In an exemplary embodiment, the first write operation policy may be a garbage collection policy wherein data stored in the selected victim segment is copied to another, different, segment for allowing the selected victim segment to be rewritten to, the second write operation policy may be a slack space recycling write operation policy wherein the data is consecutively written in slack spaces in the selected victim segment according to physical orderings in the selected victim segment, and the third write operation policy may be an in-place updating write operation policy wherein the data is randomly written in invalid page clusters of the selected victim segment.

In an exemplary embodiment, selecting the victim segment may include: searching among a plurality of used segments of the memory device for one or more used segments each having a minimum valid space; when there is exactly one used segment having the minimum valid space, selecting the one used segment having the minimum valid space as the victim segment; and when there are more than one used segment having the minimum valid space, selecting as the victim segment a one of the used segments having the minimum valid space which also has a largest sequential invalid storage space.

In an exemplary embodiment, determining each of the first, second, and third SCWCs may include accessing performance data stored in a device performance table, wherein the performance data comprises valid page sequential read times, valid page sequential write times, invalid page sequential write times, meta data read times, and meta data write times for each of a plurality of sequential data units for the memory device.

In an exemplary embodiment, the method may further include measuring the performance data for the memory device; storing the performance data in the memory device when the memory device is formatted; and when the memory device is mounted, reading the performance data from the memory device and storing the performance data in the device performance table in a second, separate, memory device of the memory controller Accordingly, the memory controller may dynamically determine a write operation policy with a minimum cost through a sequential write operation and the performance of the write operation may be enhanced.

BRIEF DESCRIPTION OF THE DRAWINGS

Illustrative embodiments of the inventive concept are described hereafter with reference to the accompanying drawings.

FIG. 3 illustrates an example of the device performance table in FIG. 1 according to an exemplary embodiment.

DETAILED DESCRIPTION OF THE EMBODIMENTS

Various embodiments of the inventive concept will now be described in some additional detail with reference to the accompanying drawings. This inventive concept may, however, be embodied in many different forms and should not be construed as being limited to only the illustrated embodiments. Rather, these embodiments are provided so that this disclosure will be thorough and complete and will fully convey the scope of the inventive concept to those skilled in the art. Throughout the written description and drawings, like reference numbers refer to like or similar elements and features.

It will be understood that, although the terms first, second, etc. may be used herein to describe various elements, these elements should not be limited by these terms. These terms are used to distinguish one element from another. For example, a first element could be termed a second element, and, similarly, a second element could be termed a first element, without departing from the scope of the inventive concept. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments and is not intended to be limiting of the inventive concept. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 1:
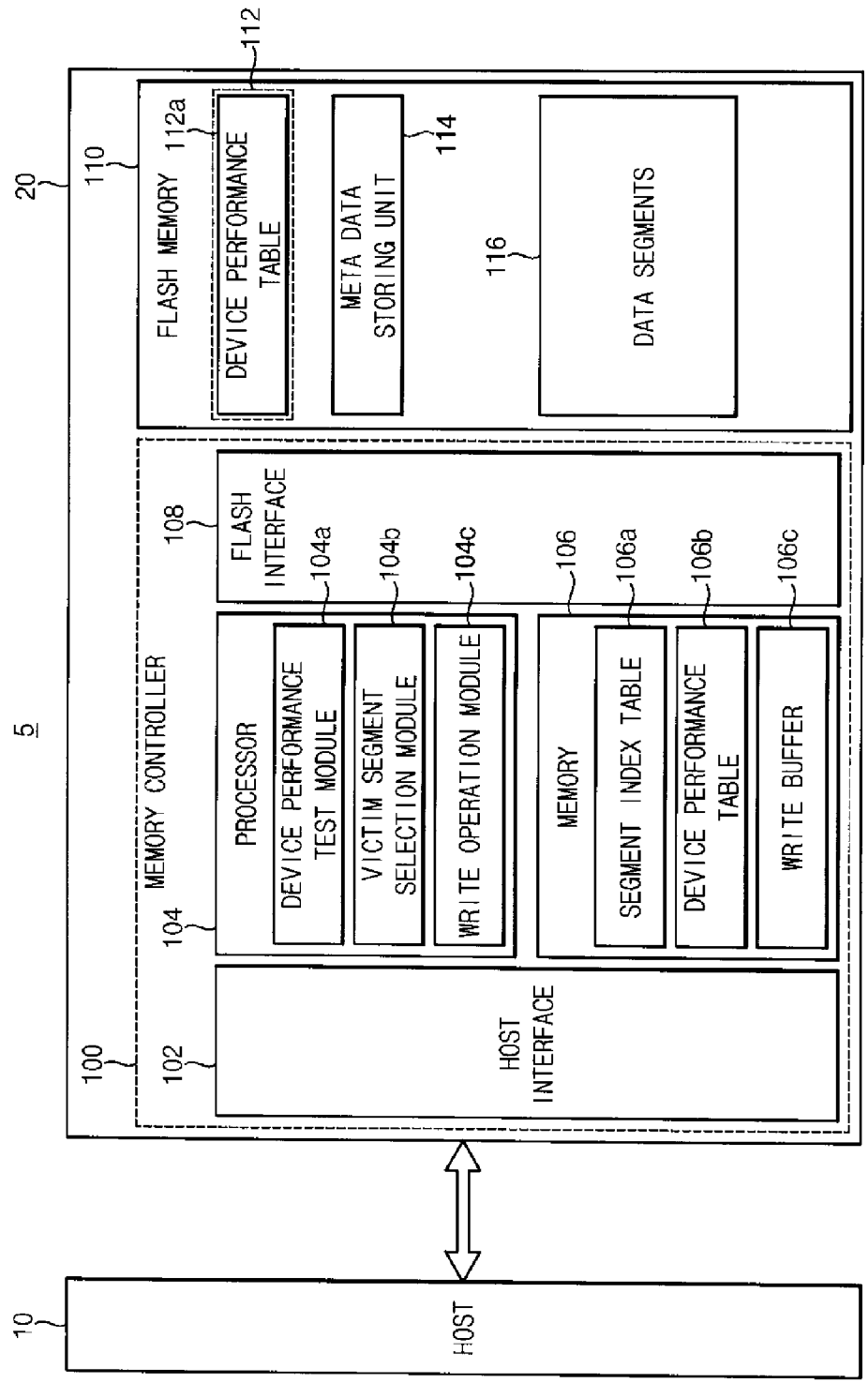
FIG. 1 is a block diagram illustrating a data storage system according to an exemplary embodiment.

FIG. 1 is a block diagram illustrating a data storage system 5 according to an exemplary embodiment.

Referring to FIG. 1, data storage system 5 may include a host 10 and a data storage device 20.

Data storage device 20 may provide host 10 with data in response to a read request, and may receive a write request and data and store received data in a specific storage space of data storage device 20. Host 10 accesses data storage device 20 in cooperation with a file system or an operating system (OS). During a read operation or a write operation, host 10 issues requests to data storage device 20 for reading data from, or writing data to, a segment including a string of logical sectors of data which has consecutive addresses.

In some exemplary embodiments, data storage device 20 may be implemented by a flash-based SSD, and data storage device 20 may include a memory controller 100 and a flash memory device 110. Memory controller 100 may include a host interface 102, a processor 104, a memory 106 and a flash interface 108.

Host interface 102 may be connected to the host 10 via one of a variety of high-speed bus protocols, such as USB (Universal Serial Bus) protocol, MMC (multimedia card) protocol, PCI (peripheral component interconnection) protocol, PCI-E (PCI-express) protocol, ATA (Advanced Technology Attachment) protocol, Serial-ATA (SATA) protocol, ESATA (External SATA) protocol, Parallel-ATA protocol, SCSI (small computer small interface) protocol, ESDI (enhanced small disk interface) protocol and IDE (Integrated Drive Electronics) protocol. Host interface 102 interfaces data exchange between host 10 and data storage device 20. Host interface 102 receives control commands and/or data from host 10 and transfers the control commands and/or the data to processor 104 through an internal bus.

Processor 104 controls overall operation of data storage device 20. Processor 104 may control data exchange between host 10 and host interface 102. Processor 104 receives the control commands and/or data from host 10 via host interface 102. Processor 104 may control data storage device 10 for storing data corresponding to the control command in memory 106 or in flash memory device 110. Processor 104 may transfer to flash interface 108 control commands/data for storing data in flash memory device 110. Therefore, flash memory device 110 may store data corresponding to the control command from flash interface 108.

Memory 106 is provided as a temporal storage space for processor 104 and may store various data required for programs which are executed by processor 104. Processor 104 may store the control commands and/or data in memory 106. Memory 106 may be implemented with a nonvolatile memory device such as a boot ROM that stores program codes for controlling operation of processor 104, and may be implemented with a volatile memory such as DRAM or SRAM that stores data exchanged between host 10 and processor 104. The DRAM may be used as a cache memory or a write buffer.

Memory 106 operates as a buffer memory that temporarily stores write data from host 10 or read data from flash memory device 110. When the data requested from host 10 is cached in memory 106, memory 106 directly provides the cached data to host 20. In general, a speed of a bus protocol between host 10 and host interface 102 is much faster than a transferring speed of a channel of data storage device 20. Memory 106 may provide a buffer space for managing the speed difference.

Flash interface 108 may control operations of flash memory device 110.

Flash memory device 110 may be provided as storage media of data storage device 20. Flash memory device 110 may include one or more of a NAND Flash Memory, a vertical NAND, a NOR Flash Memory, a Resistive Random Access Memory (RRAM), a Phase-Change Memory (PRAM), a Magnetroresistive Random Access Memory (MRAM), a Ferroelectric Random Access Memory (FRAM) and/or a Spin Transfer Torque Random Access Memory (STT-RAM). In some embodiments, flash memory device 110 may be implemented in a three-dimensional array structure.

Flash memory device 110 may be a single level cell (SLC) flash memory or a multi level cell (MLC) flash memory. Flash memory device 110 may include a device performance table storing unit 112 including a device performance table 112a, a meta data storing unit 114 for storing meta data, and data segments 116 for storing data.

A program executed by processor 104 may include a flash translation layer (FTL). The FTL may transfer a data read operation or a data write operation to flash memory device 110 according to a user's request. The FTL may convert logical addresses generated by the file system to physical addresses of flash memory device 110. Therefore, host 10 may regard flash memory device 110 as a hard disk driver due to address mapping of the FTL, and may access flash memory device 110 in a same manner to access a hard disk driver.

FTL (or processor 104) may include a device performance test module 104a, a victim segment selection module 104b and a write operation module 104c.

Figure 2:
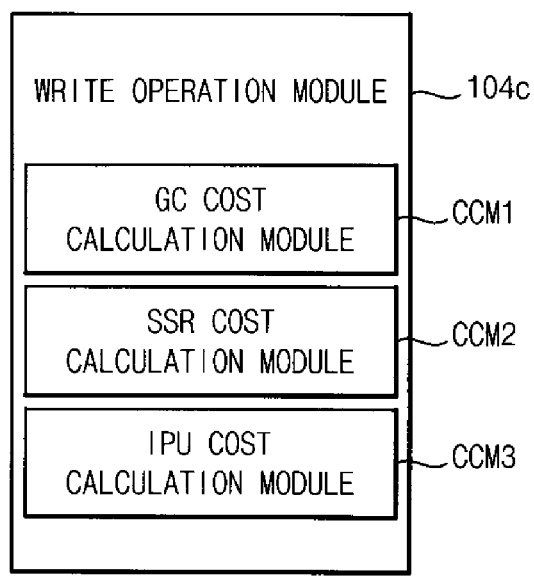
FIG. 2 is a block diagram illustrating an example of the write operation module in the processor in FIG. 1 according to an exemplary embodiment.

FIG. 2 is a block diagram illustrating an example of write operation module 104c in the processor in FIG. 1 according to an exemplary embodiment.

Referring to FIG. 2, write operation module 104c may include a garbage collection (GC) cost calculation module CCM1, a slack space recycling (SSR) cost calculation module CCM2, and an in-place updating (IPU) cost calculation module CCM3.

Referring again to FIG. 1, memory 106 may include a segment index table 106a, and a device performance table 106b which may be generated when partitions of flash memory device 110 are mounted. Segment index table 106a may be referred to by mapping logical addresses provided from host 10 to physical addresses of flash memory device 110. Device performance table 106b may include read time data and write time data for reflecting the performance of a device (i.e., flash memory device 110) when write operation module 104c calculates the costs of various write operation policies. In addition, memory 106 may further include a write buffer 106c.

FIG. 3 illustrates an example of device performance table 106b in FIG. 1 according to an exemplary embodiment.

Device performance table 106b may be generated by device performance test module 104a in processor 104 when flash memory device 110 is formatted.

Referring to FIG. 3, device performance table 106b may include valid page sequential read time VPSRT, valid page sequential write time VPSWT, invalid page sequential write time IPSWT, meta data read time MDRT, and meta data write time MDWT as entries according to page sizes by which a sequential write operation is performed.

For example, when the page size is 2 kB, and a sequential write operation is performed for 2 kB (=1 page), then the valid page sequential read time VPSRT, the valid page sequential write time VPSWT, the invalid page sequential write time IPSWT, the meta data read time MDRT and the meta data write time MDWT are respectively measured as TRV(1), TWV(1), TWIV(1), TMR(1) and TMW(1) and may be stored in device performance table 106b. Likewise, when the size by which a sequential write operation is performed is 4 kB (=2 pages), then the valid page sequential read time VPSRT, the valid page sequential write time VPSWT, the invalid page sequential write time IPSWT, the meta data read time MDRT and the meta data write time MDWT are respectively measured as TRV(2), TWV(2), TWIV(2), TMR(2) and TMW(2) and may be stored in device performance table 106b.

In general, when a same amount of data is written, a time required for a sequential write operation is shorter than a time required for a random write operation. Therefore, when the data is written by the sequential write operation, the performance of data storage device 20 may be enhanced.

For example, when the valid page sequential write time VPSWT is normalized by the unit page, the normalized valid page sequential write times are as follows: TRV(1)>TRV(2)/2>TRV(4)/4>TRV(8)/8>TRV(16)/16>TRV(32)/32. That is, a random read time required for a single page is longer than a normalized sequential and consecutive write time required for a plurality of pages. In addition, as a number in the plurality of pages in the sequential and consecutive write operation increases, the normalized sequential and consecutive write time required for the unit page is reduced.

When a consecutive write time or a desired consecutive read time for a desired number of pages is not included in device performance table 106b, the consecutive write time or the desired consecutive read time for the desired number of pages may be calculated by interpolating between consecutive read times or consecutive write times for adjacent numbers of pages which are included in device performance table 106b. For example, a consecutive write time or a consecutive read time for 10 pages may be calculated by referring to the consecutive read time for 8 pages, the consecutive write time for 8 pages, the consecutive read time for 16 pages, and the consecutive write time for 16 pages according to Equation 1.

$$TRV(10)=TRV(8)+(10-8)\times[\{TRV(16)-TRV(8)\}/8]$$

$$TWV(10)=TWV(8)+(10-8)\times[\{TWV(16)-TWV(8)\}/8]$$

$$TWIV(10)=TWIV(8)+(10-8)\times[\{TWIV(16)-TWIV(8)\}/8]$$

$$TMR(10)=TMR(8)+(10-8)\times[\{TMR(16)-TMR(8)\}/8]$$

$$TMW(10)=TMW(8)+(10-8)\times[\{TMW(16)-TMW(8)\}/8] \quad \text{[Equation 1]}$$

Device performance table 106b may be variously implemented according to conditions such as page sizes of flash memory device 110, a single level cell, and a multi-level cell.

The measured device performance test data is constructed as an on-disk data structure and is stored in device performance table storing unit 112 that stores device performance table 112a. In particular, device performance table 112a may be filled by performing a device performance measuring algorithm when flash memory device 110 is formatted, and the filled device performance table 112a may be stored in a super block in flash memory device 110. While flash memory device 110 is mounted, the contents of device performance table 112a stored in the super block may be read from flash memory device 110 and may be mounted in device performance table 106b in memory 106. Device performance table 106b may be referred to when the costs of various write control policies are calculated during a sequential and consecutive write operation.

Figure 4:
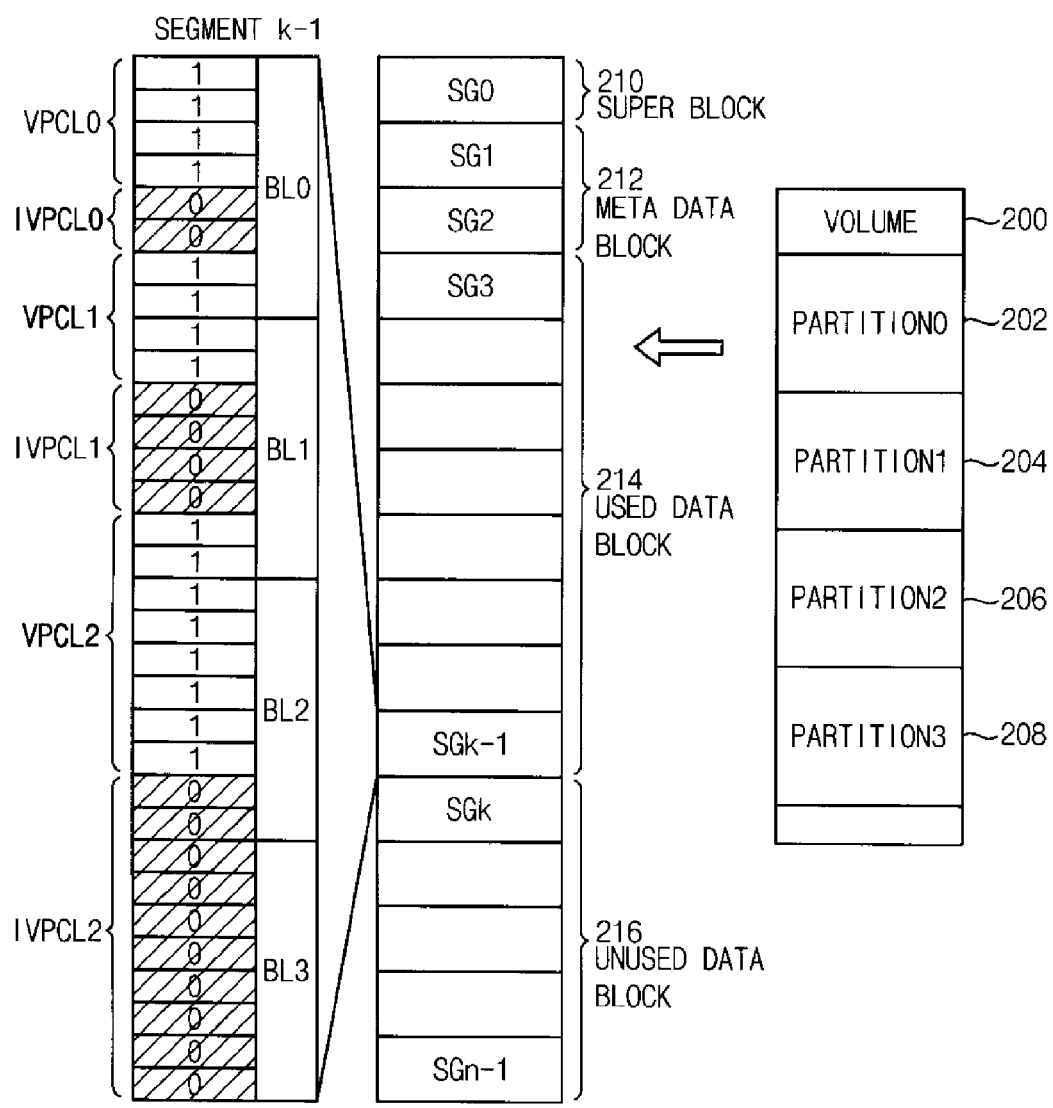
FIG. 4 illustrates an example of a physical storage space of the flash memory device according to an exemplary embodiment.

FIG. 4 illustrates an example of a physical storage space of flash memory device 110 according to an exemplary embodiment.

Referring to FIG. 4, a physical storage space, i.e., a volume 200 may be divided into a plurality of partitions 202, 204, 206 and 208. Each of partitions 202, 204, 206 and 208 have the same size or a different size with respect to each other.

Each of partitions 202, 204, 206 and 208, for example, first partition 202 may be divided into n segments SG0~SGn-1. Each of the segments SG0~SGn-1 may have the same size as each other. A first segment. i.e., an uppermost segment SG0 may include a super block 210 that is allocated for storing segment index table 106a, including location information of each of the segments SG0~SGn-1 in the partition of (e.g., partition 202) of volume 200 of flash memory device 110, and device performance table 112a. The segments SG1 and SG2 corresponding to a meta data block 212 may be allocated for storing meta data. The size of the segments SG1 and SG2 may be varied according to the size of generated meta data. When the utilization of partitions 202, 204, 206 and 208 increases, the amount of the generated meta data may also increase. Therefore, the space for storing data may be decreased and the meta data may serve as an overhead. The segments SG3~SGk-1 corresponding to used data blocks 214 are used segments, and the segments SGk~SGn-1 corresponding to unused data blocks 216 are unused segments.

In the example illustrated in FIG. 4, each of the segments SG0~SGn-1, for example the segment SGk-1, may include a plurality of data blocks BL0~BL3, and each of the data blocks BL0~BL3 may include 8 pages. In various embodiments, each of the segments SG0~SGn-1 may include a number of data blocks which is less than or greater than 8.

In the example of FIG. 4, a page with "1" is a valid page and a page with "0" is an invalid page. "Invalid" indicates a state wherein a logical address is not associated with a physical address and "valid" indicates a state wherein a logical address is associated with a physical address. When a page is invalid, a corresponding logical address cannot designate an area of a corresponding physical address. When a page is valid, a corresponding logical address can designate an area of a corresponding physical address.

As shown in the example of FIG. 4, first block BL0 may include a valid page cluster VPCL0 including 4 consecutive valid pages, and an invalid page cluster IVPCL0 including 2 consecutive invalid pages. A valid page cluster VPCL1 includes 4 consecutive valid pages and an invalid page cluster IVPCL1 includes 4 consecutive invalid pages. A valid page cluster VPCL2 includes 8 consecutive valid pages and an invalid page cluster IVPCL1 includes 10 consecutive invalid pages.

The storage space corresponding to the invalid pages is managed as segment slack space per segment, and the segment slack space may be recycled for storing valid data later.

Figure 5:
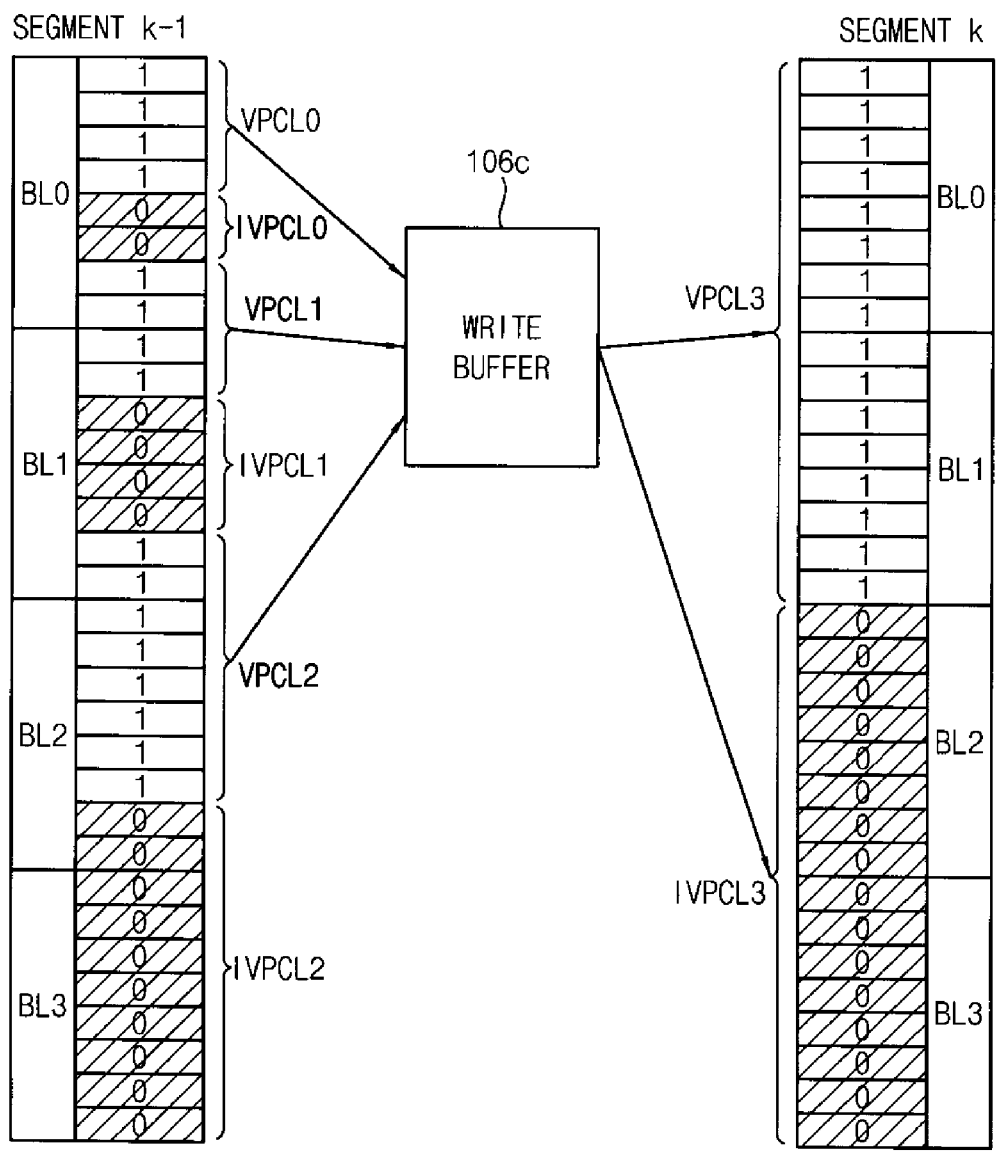
FIG. 5 illustrates an example for explaining an algorithm for calculating a first sequential and consecutive write cost (SCWC) according to a GC write operation policy according to an exemplary embodiment.

FIG. 5 illustrates an example for explaining an algorithm for calculating a first sequential and consecutive write cost (SCWC) according to a GC write operation policy according to an exemplary embodiment.

An algorithm for calculating the first SCWC according to the GC write operation policy performed in the GC cost calculation module CCM1 may be formulated according to Equation 2.

$$\text{Cost (GC)} = \Sigma_{j=1}^{p} T_{read}^{data}(N_{valid}^{j}) - T_{write}^{data}(\Sigma_{j=1}^{p} N_{valid}^{j}) + T_{write}^{data}(\Sigma_{j=1}^{q} N_{invalid}^{j}) + T_{read}^{meta}(\Sigma_{j=1}^{p} N_{valid}^{j}) | T_{write}^{meta}(\Sigma_{j=1}^{p} N_{valid}^{j} | \Sigma_{j=1}^{q} N_{invalid}^{j})$$

[Equation 2]

In the equation 2, $N_{valid}^{j}$ denotes a number of valid pages included in an $i^{th}$ valid page cluster, $N_{invalid}^{j}$ denotes a number of invalid pages included in an $i^{th}$ invalid page cluster, $T_{read}^{data}(X)$, $T_{write}^{data}(X)$ respectively denote consecutive read time for x pages and consecutive write time for x pages, and $T_{read}^{meta}(X)$, $T_{write}^{meta}(X)$ respectively denote meta data read time for x pages and meta data write time for x pages.

Hereinafter, there will be provided a description of an algorithm for calculating the first SCWC according to the GC write operation policy with reference to FIG. 5 and Equation 2.

In the illustrated example, it is assumed that data stored in the segment SGk-1 is copied to the segment SGk for allowing the segment SGk-1 to be erased and rewritten to with new data.

In the illustrated example, the sum of respective valid page consecutive read times $\Sigma_{j=1}^{p} T_{read}^{data}(N_{valid}^{j})$ for consecutive valid page clusters VPCL0, VPCL1 and VPCL2 to write buffer 106c corresponds to TRV(4)+TRV(4)+TRV(8). That is, 4 page of data, 4 pages of data and 8 pages of data in the valid page clusters VPCL0, VPCL1 and VPCL2 are read respectively. By referring to device performance table 106b, TRV(4), TRV(4) and TRV(8) are obtained, and the sum of respective valid page consecutive read times $\Sigma_{j=1}^{p} T_{read}^{data}(N_{valid}^{j})$ corresponds to TRV(4)+TRV(4)+TRV(8).

In the illustrated example, the sum of respective valid page consecutive write times $T_{write}^{data}(\Sigma_{j=1}^{p} N_{valid}^{j})$ for all valid page clusters VPCL0, VPCL1 and VPCL2 to the segment SGk corresponds to TWV(4+4+8)=TWV(16). That is, by referring to device performance table 106b, TWV(16) is obtained and TWV(16) is the segment valid page consecutive write time required for writing data in a new valid page cluster VPCL3 generated based on all valid pages in write buffer 106c.

The sum of respective invalid page consecutive write times $T_{write}^{data}(\Sigma_{j=1}^{q} N_{invalid}^{j})$ for all invalid page clusters IVPCL0, IVPCL1 and IVPCL2 to the segment SGk corresponds to TWIV(2+4+10)=TWIV(16). That is, by referring to device performance table 106b, TWIV(16) is obtained and TWV(16) is the segment invalid page consecutive write time required for writing data in a new invalid page cluster IVPCL3 generated based on all invalid pages in write buffer 106c.

Meta data read times $T_{read}^{meta}(\Sigma_{j=1}^{p} N_{valid}^{j})$ associated with all of the valid pages in all clusters from meta data block 212 corresponds to TMR(4+4+8)=TMR(16). That is, by referring to device performance table 106b, TMR(16) is obtained and TMR(16) is a meta data read time which is referred to when reading all of the valid pages in the segment SGk-1.

Meta data write times $T_{write}^{meta}(\Sigma_{j=1}^{p} N_{valid}^{j} + \Sigma_{j=1}^{q} N_{invalid}^{j})$ associated with all pages in all clusters to meta data block 212 corresponds to TMW(4+4+8+2+4+10)=TMW(32). That is, by referring to the device performance table 106b, TMW(32) is obtained and TMR(32) is a meta data write time which is newly generated when writing all of the pages in the segment SGk.

That is, for calculating the first SCWC according to the GC write operation policy, the GC cost calculation module CCM1: calculates a valid page consecutive read time for each of one or more consecutive valid page cluster(s) in the selected segment to calculate a segment valid page read time corresponding to a sum of the valid page consecutive read times; calculates a first consecutive write time for all of valid pages in the selected segment; calculates a second consecutive write time for all of invalid pages in the selected segment; calculates a meta data read time for all of the valid pages in the selected segment; calculates a meta data write time for all of the valid pages and the invalid pages in the selected segment; and determines a sum of the segment valid page read time, the first consecutive write time, the second consecutive write time, the meta data read time and the meta data write time as the first SCWC.

Figure 6:
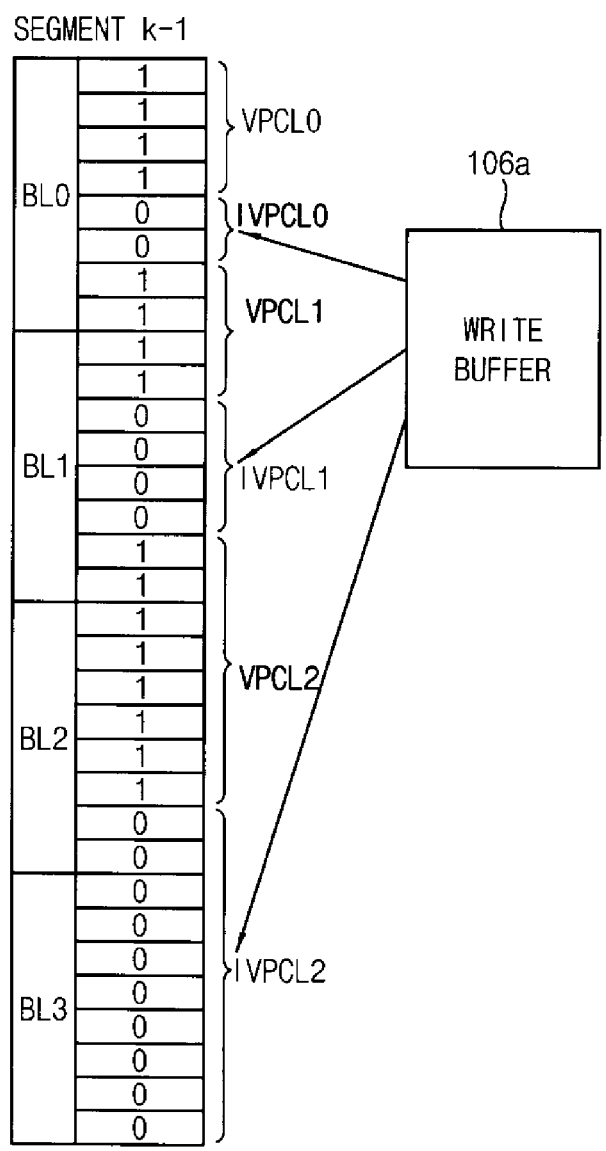
FIG. 6 illustrates an example for explaining an algorithm for calculating a second SCWC according to SSR write operation policy according to an exemplary embodiment.

FIG. 6 illustrates an example for explaining an algorithm for calculating a second SCWC according to an SSR write operation policy according to an exemplary embodiment.

An algorithm for calculating the second SCWC according to the SSR write operation policy performed in the SSR cost calculation module CCM2 may be formulated according to Equation 3.

$$\text{Cost (SSR)} = \Sigma_{j=1}^{q} T_{write}^{data}(N_{invalid}^{j}) + T_{write}^{meta}(\Sigma_{j=1}^{q} N_{invalid}^{j}) \quad [\text{Equation 3}]$$

Hereinafter, there will be provided a description of an algorithm for calculating the second SCWC according to the SSR write operation policy with reference to FIG. 6 and Equation 3.

According to the SSR write policy, it is assumed that data is consecutively written in the slack spaces in the segment SGk−1 according to physical orderings of the segment SGk−1.

The sum of respective invalid page consecutive write times $\Sigma_{j=1}^{q} T_{write}^{data}(N_{invalid}^{j})$ of pages in write buffer 106a for the invalid pages IVPCL 0, IVPCL 1 and IVPCL 2, i.e., slack spaces of the segment SGk−1, corresponds to TWIV(2)+TWIV(4)+TWIV(10). Since, 2 page of data, 4 pages of data, and 10 pages of data are to be written, by referring to device performance table 106b, TWIV(2), TWIV(4) and TWIV(10) need to be obtained and the sum of respective invalid page consecutive write times $\Sigma_{j=1}^{q} T_{write}^{data}(N_{invalid}^{j})$ corresponds to TWIV(2)+TWIV(4)+TWIV(10). In this case, since TWIV (10) can not be obtained by referring to device performance table 106b, TWIV(10) may be obtained by interpolating TWIV(8) and TWIV(16) according to Equation 4.

$$TWIV(10) = TWIV(8) + (10-8) * [\{TWIV(16) - TWIV(8)\}/8] \quad [\text{Equation 4}]$$

Therefore, TWIV(2)+TWIV(4)+TWIV(10) denotes the segment slack space write time.

A segment slack space meta data write time $T_{write}^{meta}(\Sigma_{j=1}^{q} N_{invalid}^{j})$ associated with the segment slack space including all invalid page clusters to the meta data block 212 corresponds to TMW(2+4+10)=TMW(16). That is, by referring to the device performance table 106b, TMW(16) is obtained and TMR(16) is a meta data write time which is newly generated when writing all of the pages in the slack space in the segment SGk−1.

That is, for calculating the second SCWC according to the SSR write operation policy, the SSR cost calculation module CCM2 calculates an invalid page consecutive write time for each of one or more consecutive invalid page cluster(s) in the selected segment to calculate a segment slack space write time corresponding to a sum of the invalid page consecutive write times, calculates a segment slack space meta data write time corresponding to a meta data write time for all of invalid pages in the selected segment, and determines a sum of the segment slack space write time and the segment slack space meta data write time as the second SCWC.

Figure 7:
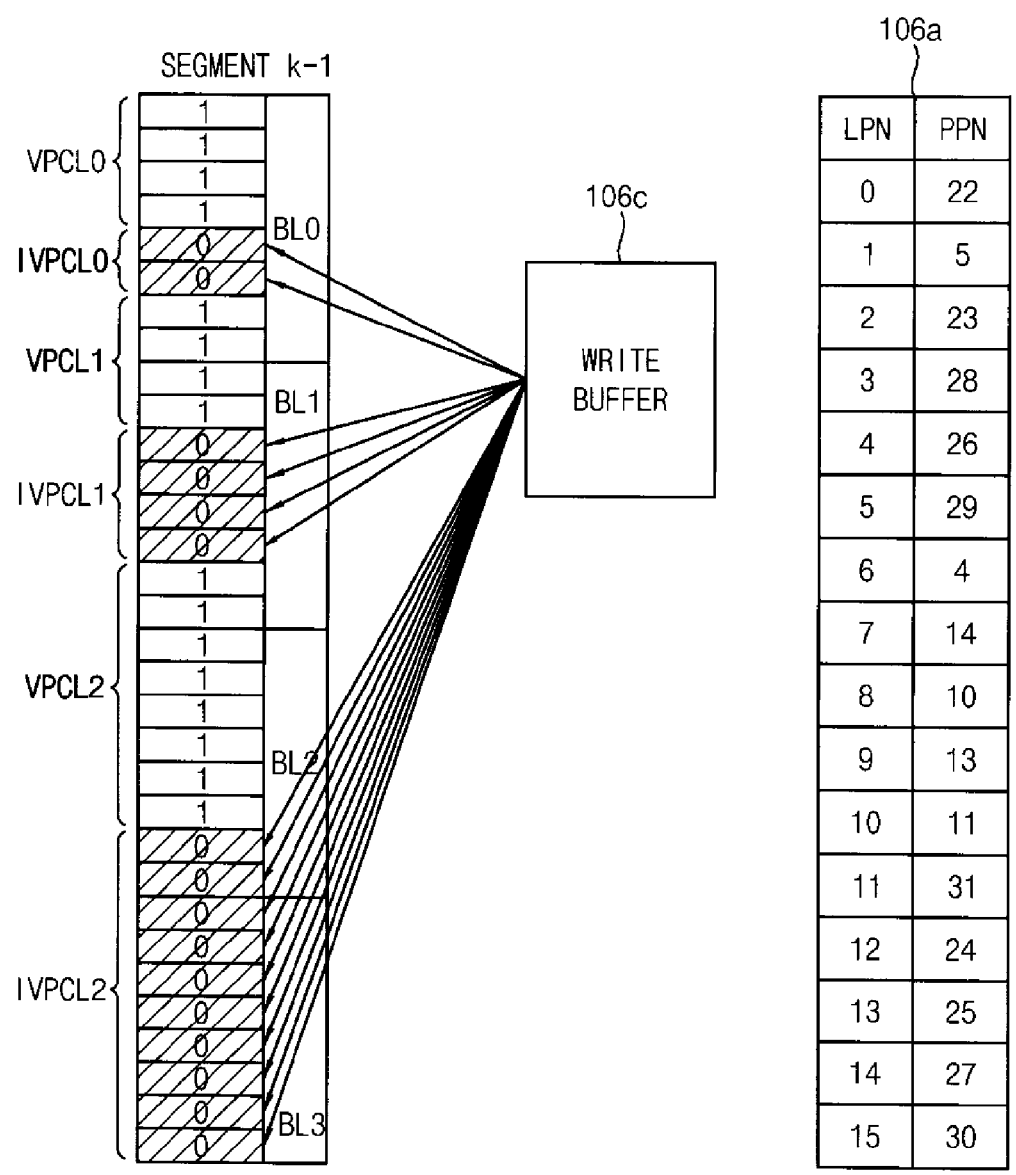
FIG. 7 illustrates an example for explaining an algorithm for calculating a third SCWC according to IPU write operation policy according to an exemplary embodiment.

FIG. 7 illustrates an example for explaining an algorithm for calculating a third SCWC according to an IPU write operation policy according to an exemplary embodiment.

An algorithm for calculating the third SCWC according to the IPU write operation policy performed in the IPU cost calculation module CCM3 may be formulated according to Equation 5.

$$\text{Cost (IPU)} = T_{write}^{data}(1)(\Sigma_{j=1}^{q} N_{invalid}^{j}) \quad [\text{Equation 5}]$$

Hereinafter, there will be provided a description of an algorithm for calculating the third SCWC according to the IPU write operation policy with reference to FIG. 7 and Equation 5.

It is assumed that data is randomly written in the invalid page clusters of the segment SGk−1 according to logical orderings.

The write time $T_{write}^{data}(1)(\Sigma_{j=1}^{q} N_{invalid}^{j})$ of pages at areas designated by physical page number (PPN) sequentially corresponding to logical page number (LPN) in write buffer 106c to the invalid page clusters IVPCL0, IVPCL1 and IVPCL2 of the segment SGk−1 by referring to a mapping table in segment index table 106a corresponds to TWIV(1)×(2+4+10)=16TWIV(1). In this case, the data is randomly written in the pages of the invalid page clusters IVPCL0, IVPCL1 and IVPCL2 without physical ordering because the data is written according to logical ordering. Therefore, the write time $T_{write}^{data}(1)(\Sigma_{j=1}^{q} N_{invalid}^{j})$ corresponds to a sum of write times of each unit page of all invalid pages in a selected segment.

Figure 8:
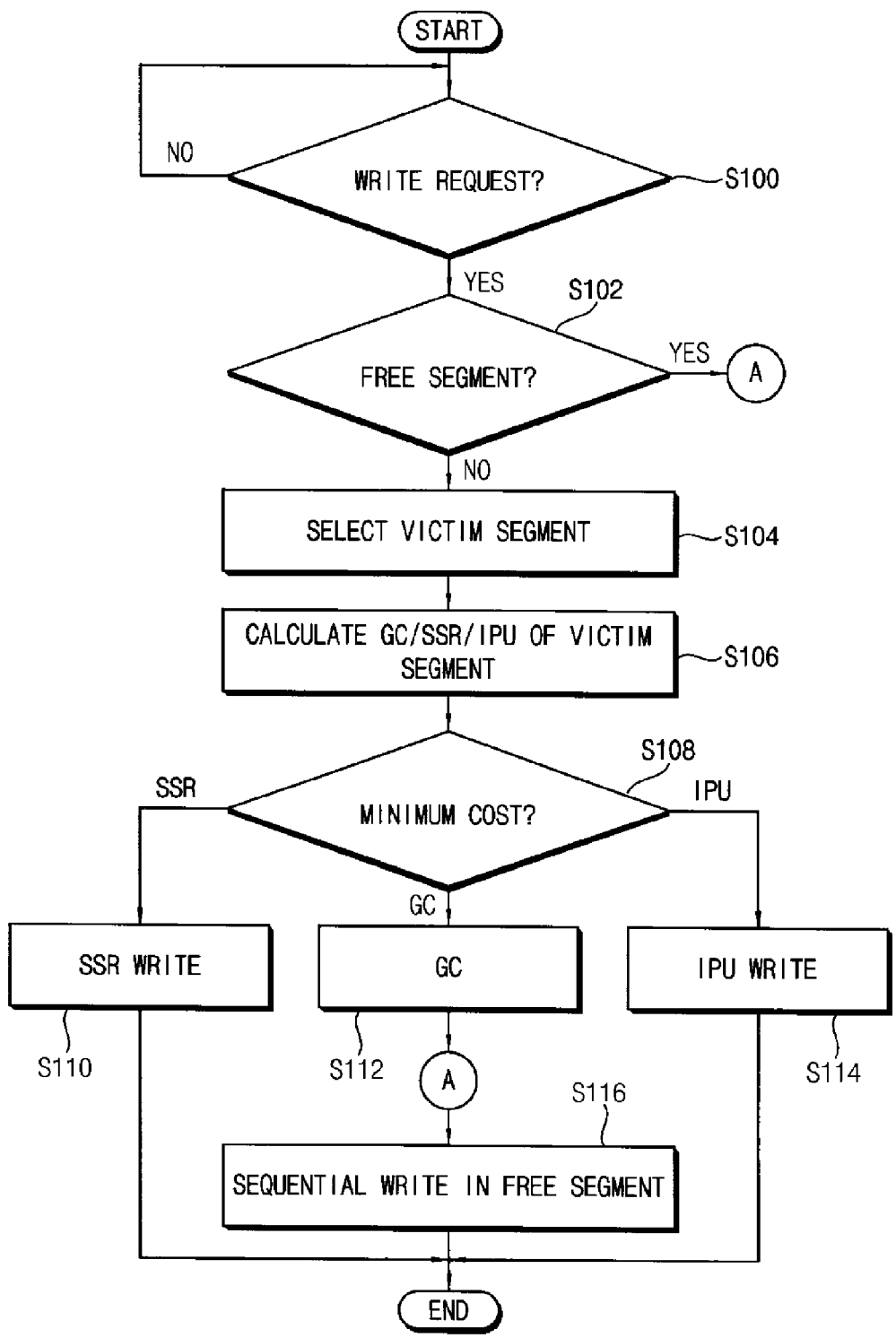
FIG. 8 is a flow chart illustrating a method of managing a storage device based on a sequentiality according to an exemplary embodiment.

FIG. 8 is a flow chart illustrating a method of managing a storage device based on a sequentiality according to an exemplary embodiment.

Hereinafter, there will be provided a description of a method of managing the storage device based on sequentiality, with reference to FIGS. 1, 2 and 8.

Referring to FIGS. 1, 2 and 8, processor 104 in data storage device 20 checks whether a write request from host 10 is received through host interface 102 (S100). When the write request from host 10 is received (YES in S100), processor 104 enables write operation module 104c. When the write request from the host 10 is not received (NO in S100), the processor 104 continues to check whether the write request from host 10 is received (S100). Write operation module 104c checks whether free segments, i.e., unused segments, exist in a volume or partition of a memory device (e.g., flash memory device 110) by referring to segment index table 106a (S102). When unused segments exist (YES in S102), step S116 is performed through an operation at connection node A. In step S116, data is sequentially written in the unused segments according to physical ordering without regard to logical addresses, meta data associated with valid pages is generated, and the generated meta data is written in meta data storage unit 114.

When unused segments do not exist (NO in S102), it is determined in subsequent steps whether the GC operation is to be performed for generating one or more new unused segments, or whether data is to be written in the invalid page clusters of one or more used segments. In the GC operation, one or more of the used segments are selected as a victim segment and the victim segment is erased to generate a new unused segment.

Processor 104 selects a victim segment through victim segment selection module 104b (S104). Processor 104: calculates a first SCWC for the selected victim segment corresponding to the GC write operation policy, calculates a second SCWC for the selected victim segment corresponding to the SSR write operation policy, and calculates a third SCWC for the selected victim segment corresponding to the IPU write operation policy respectively (S106). In step S108, processor 104 determines a write operation policy which has the lowest or minimum cost among the first through third SCWCs. For example, in step S108, the SSR write operation policy may be selected when the first SCWC is too high, and the IPU write operation policy may be selected when the first SCWC is too high and the utilization of the segments is also high. When the SSR write operation policy is selected (SSR in S108), write operation module 104 writes data to the victim segment according to the SSR write operation policy (S110). When the GC write operation policy is selected (GC in S108), write operation module 104 erases the victim segment by performing the GC operation (S112) and performs the step S116 through the connection node A. When the IPU write operation policy is selected (IPU in S108), write operation module 104 writes data to the victim segment according to the IPU write operation policy (S114).

Figure 9:
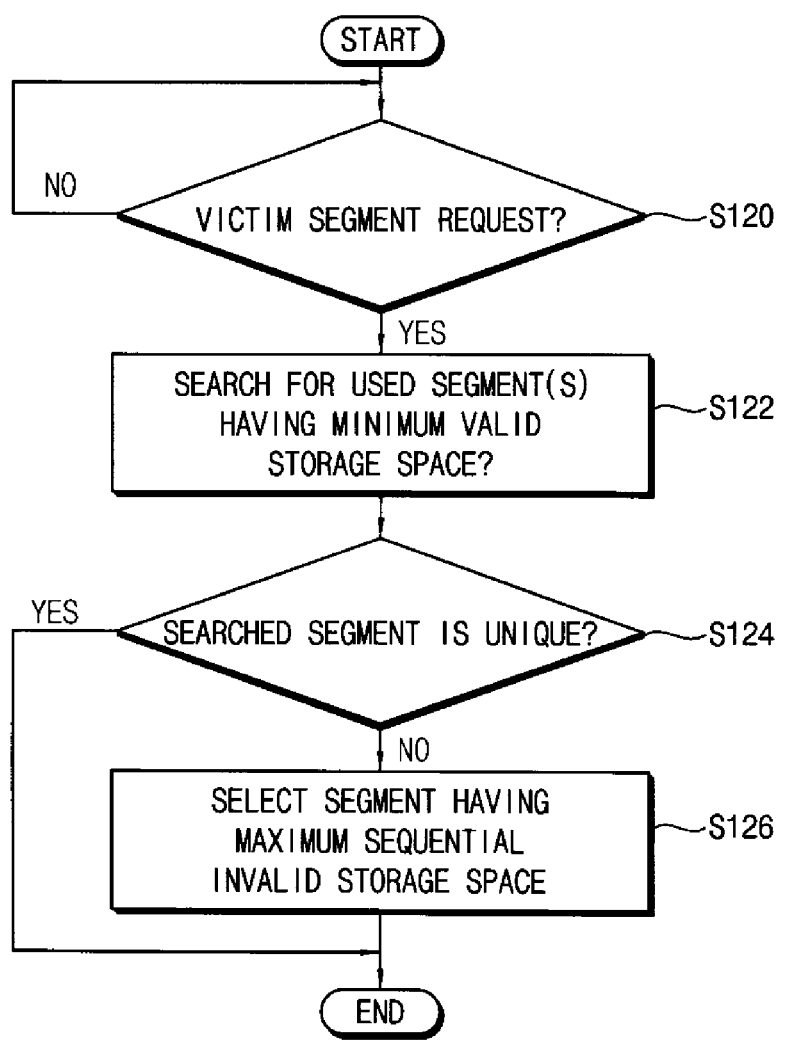
FIG. 9 is a flow chart illustrating a step of selecting victim segment in FIG. 8 according to an exemplary embodiment.

FIG. 9 is a flow chart illustrating a step of selecting victim segment (i.e., step S104) in FIG. 8 according to an exemplary embodiment.

Referring to FIGS. 1, 2 and 9, for selecting the victim segment, victim segment selection module 104 checks whether a victim segment selection request is received (S120). When the victim segment selection request is received (YES in S120), victim segment selection module 104 searches for a segment or segments in a volume or partition of the memory device (e.g., flash memory device 110) having a minimum valid storage space among the used segments (S122) of the volume or partition. In step S122, a greedy algorithm or a cost-benefit algorithm may be used for searching for the segment having the minimum valid storage space. The victim segment selection module 104 determines whether the segment having the minimum valid storage space is unique, or instead whether there are more than one segment having the minimum valid storage space (S124). When the segment having the minimum valid storage space is unique (YES in S124), information identifying the searched segment is provided to write operation module 104c as information of the victim segment. When the searched segment is not unique, (NO in S124), i.e. when there are a plurality of segments having the minimum valid storage space, then victim segment selection module 104 searches the sequentiality of invalid storage space within the a plurality of segments having the minimum valid storage space, and selects (S126) the segment having the largest or maximum sequential invalid storage space.

Figure 10:
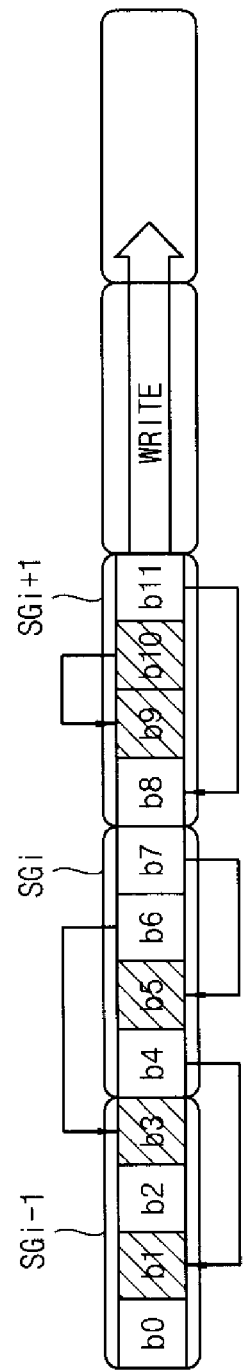
FIG. 10 is a diagram for explaining operation of selecting victim segment in FIG. 9 according to an exemplary embodiment.

FIG. 10 is a diagram for explaining an example operation of a process of selecting a victim segment as illustrated in FIG. 9 according to an exemplary embodiment.

Referring to FIGS. 9 and 10, the segment SGi−1 includes two valid blocks b0 and B1 and two invalid blocks b1 and b3. The segment SGi includes three valid blocks b4, b6 and b7 and one invalid block b5. The segment SGi+1 includes two valid blocks b8 and b11 and two invalid blocks b9 and b10. Therefore, in step S122, victim segment selection module 104 searches the segments SGi−1 and SGi+1 as segments having a minimum valid storage space. Since there are two searched segments, SGi−1 and SGi+1, victim segment selection module 104 searches the sequentiality of invalid storage space of the segments SGi−1 and SGi+1. Since the invalid blocks b9 and b10 are consecutive in the segment SGi+1, victim segment selection module 104 selects the segment SGi+1 as the victim segment. Victim segment selection module 104 selects the segment SGi+1 as the victim segment because the cost of writing data in the invalid blocks b9 and b10 that are consecutive is lower than the cost of writing data in the invalid blocks b1 and b3 that are not consecutive. Victim segment selection module 104 provides information of the segment SGi+1 to write operation module 104c.

That is, according to exemplary embodiments, the victim segment is selected considering the cost of writing data sequentially and consecutively.

Figure 11:
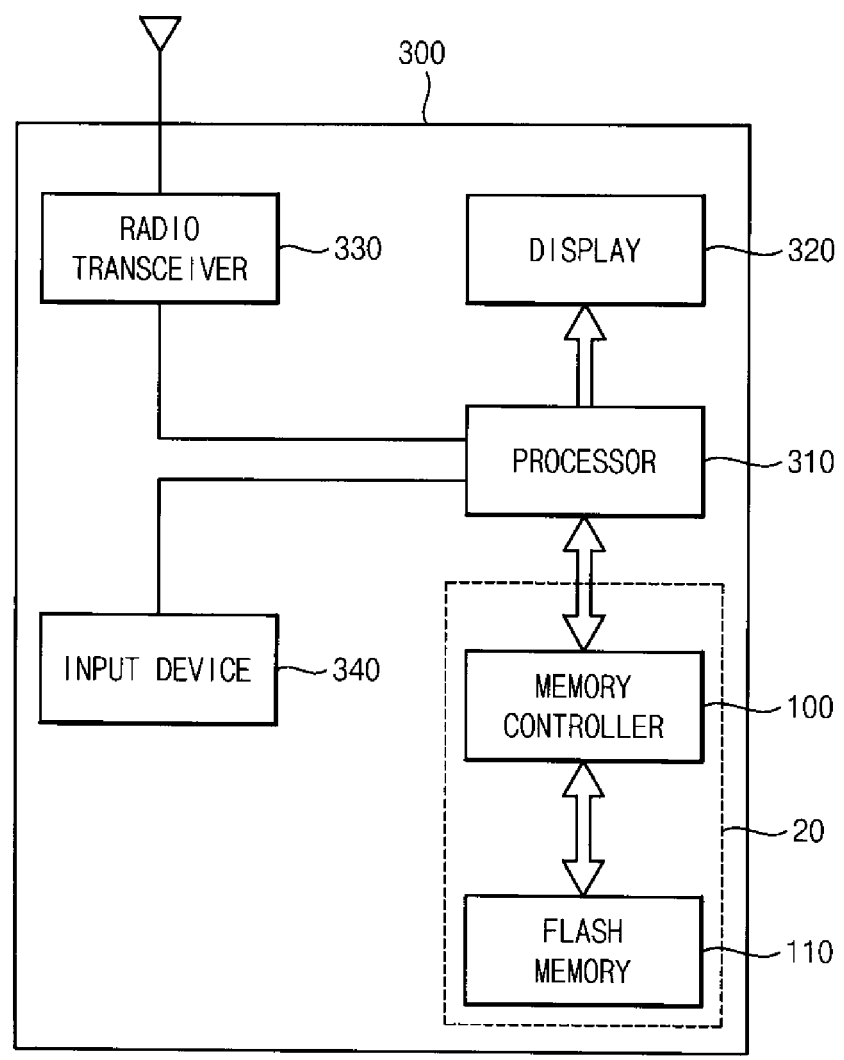
FIG. 11 is a block diagram illustrating an electronic device including the data storage device 20 in FIG. 1 according to an exemplary embodiment.

FIG. 11 is a block diagram illustrating an electronic device 300 including data storage device 20 in FIG. 1 according to an exemplary embodiment.

Referring to FIG. 11, electronic device 300 which may be embodied in a cellular phone, a smart phone, a tablet personal computer (PC), a portable communication device, or a wireless internet device may include a radio transceiver 330, an input device 340, a display 320, a processor 310, and data storage device 20 having flash memory 110 and memory controller 100 which may control an operation of the flash memory 110. Memory controller 100 also may be controlled by a processor 310 controlling a general operation of electronic device 300. Memory controller 100 may dynamically determine a write operation policy with a minimum cost through a sequential write operation under control of processor 310.

Data stored in flash memory 110 may be displayed through display 320 under a control of processor 310. Radio transceiver 330 may transmit or receive radio signals through an antenna ANT. For example, radio transceiver 330 may convert radio signals received through an antenna ANT into signals that processor 310 may process. Accordingly, processor 310 may process signals output from radio transceiver 330 and store processed signals in flash memory 110 and/or display them through display 320.

Moreover, radio transceiver 330 may convert signals output from processor 310 into radio signals and output converted radio signals externally through antenna ANT.

Input device 340 may be a device which may input control signals to control an operation of processor 310 or data to be processed by processor 310. Input device 340 may be embodied in a pointing device such as a touch pad and a computer mouse, a keypad or a keyboard.

Processor 310 may control an operation of display 320 so that data output from flash memory 110, radio signals output from radio transceiver 330 and/or data output from input device 340 may be displayed through display 320.

Figure 12:
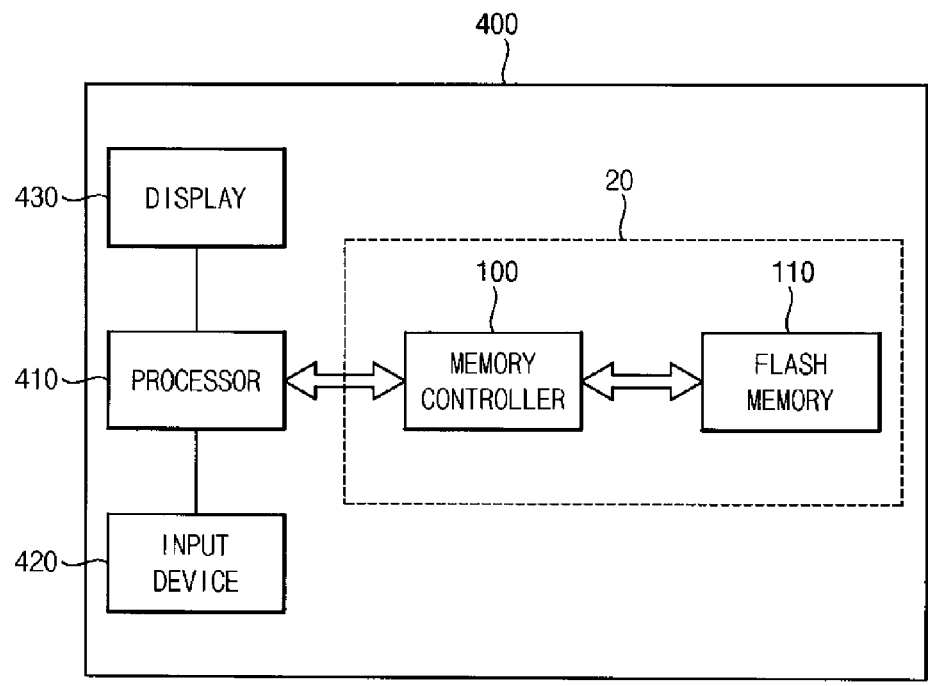
FIG. 12 is a block diagram illustrating an electronic device including the data storage device in FIG. 1 according to another exemplary embodiment.

FIG. 12 is a block diagram illustrating an electronic device 400 including the data storage device in FIG. 1 according to another exemplary embodiment.

Referring to FIG. 12, an electronic device 400 which may be embodied in a data processing device such as a personal computer (PC), a tablet computer, a laptop computer, a netbook, an e-reader, a personal digital assistant (PDA), a portable multimedia player (PMP), a MP3 player or a MP4 player may include a processor 410, an input device 420, a display 430 and data storage device 20 having flash memory 110 and memory controller 100 which may control an operation of the flash memory 110.

Processor 410 may control a general operation of electronic device 400. Memory controller 100 may be controlled by processor 410 to control a general operation of electronic device 400. For example, memory controller 100 may dynamically determine a write operation policy with a minimum cost through a sequential write operation under control of processor 410.

Processor 410 may display data stored in flash memory 110 through a display 430 according to an input signal generated by input device 420. For example, input device 420 may be embodied in a pointing device such as a touch pad or a computer mouse, a keypad or a keyboard.

Figure 13:
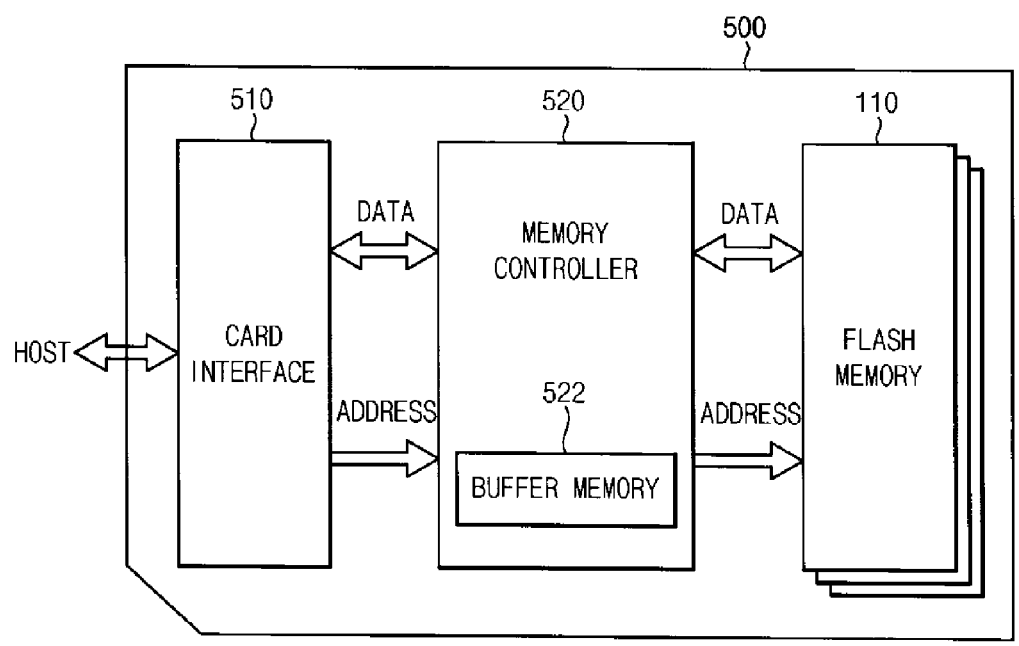
FIG. 13 is a block diagram illustrating an electronic device including the data storage device in FIG. 1 according to still another exemplary embodiment.

FIG. 13 is a block diagram illustrating an electronic device 500 including the data storage device in FIG. 1 according to still another exemplary embodiment.

Referring to FIG. 13, an electronic device 500 includes a card interface 510, a memory controller 520 and at least one flash memory 110.

Electronic device 500 may transmit or receive data with a host through card interface 510. According to an exemplary embodiment, card interface 510 may be a secure digital (SD) card interface or a multi-media card (MMC) interface, however, it is not restricted thereto. Card interface 510 may interface data exchange between a host and memory controller 520 according to a communication protocol of a host which may communicate with electronic device 500.

Memory controller 520 may control a general operation of electronic device 500 and control data exchange between card interface 510 and non-volatile memory device 110. In addition, a buffer memory 522 of memory controller 520 may buffer data transmitted or received between card interface 510 and flash memory device 110.

Memory controller 520 may be connected to card interface 510 and the non-volatile memory 110 through a data bus DATA and an address bus ADDRESS. According to an exemplary embodiment, memory controller 520 may receive an address of data to read and/or to write from card interface 510 through an address bus ADDRESS, and transmit it to flash memory 110. Memory controller 520 may perform an identical or similar function as memory controller 100 in FIG. 1. Therefore, memory controller 520 may dynamically determine a write operation policy with a minimum cost through a sequential write operation.

When electronic device 500 of FIG. 13 is connected to a host such as a computer, a digital camera, a digital audio player, a cellular phone, console video game hardware or a digital set-top box, the host may receive or transmit data stored in at least one flash memory 110 through card interface 510 and memory controller 520.

Figure 14:
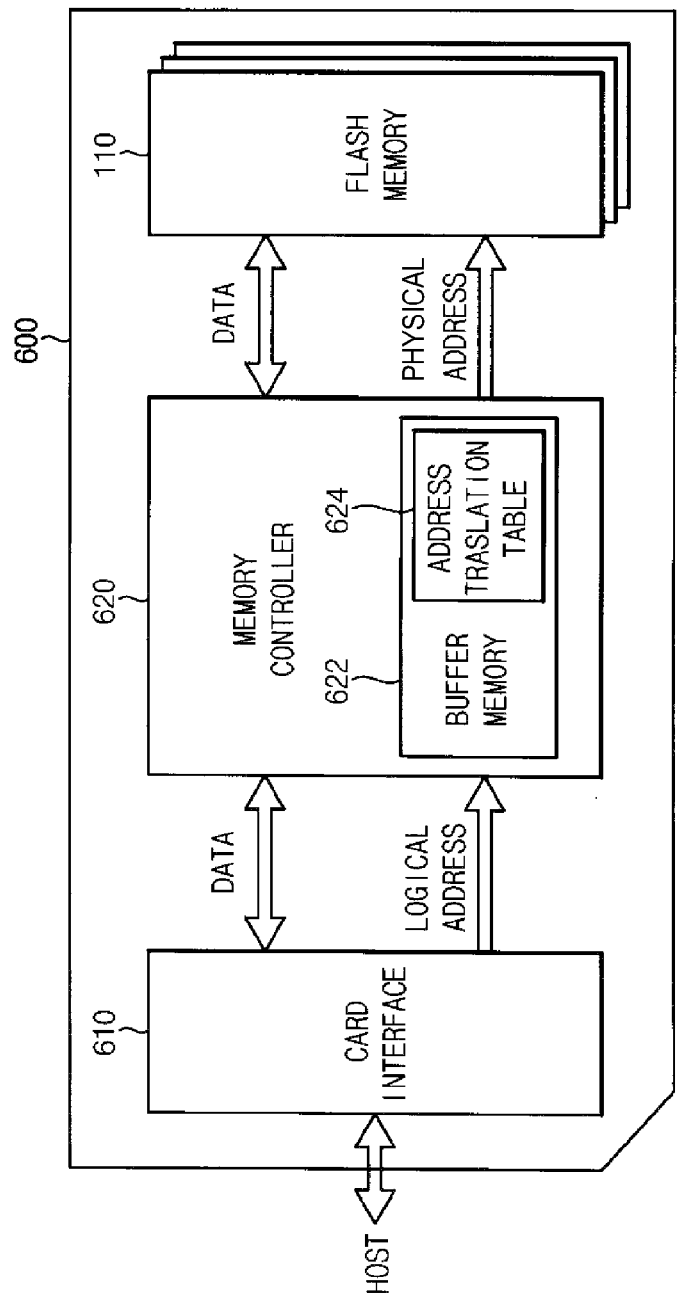
FIG. 14 is a block diagram illustrating an electronic device including the data storage device in FIG. 1 according to still another exemplary embodiment.

FIG. 14 is a block diagram illustrating an electronic device 600 including the data storage device in FIG. 1 according to still another exemplary embodiment.

Referring to FIG. 14, electronic device 600 includes a card interface 610, a memory controller 620 and at least one flash memory 110.

Electronic device 600 may perform a data communication with a host through the card interface 610. According to an exemplary embodiment, card interface 610 may be a secure digital (SD) card interface or a multi-media card (MMC) interface, however, it is not restricted thereto. Card interface 610 may perform a data communication between a host and memory controller 620 according to a communication protocol of a host which may communicate with electronic device 600.

Memory controller 620 may control a general operation of electronic device 600 and control data exchange between card interface 610 and the at least one flash memory 110.

A buffer memory 622 included in memory controller 620 may store various kinds of data to control a general operation of electronic device 600. Memory controller 620 may be connected to card interface 610 and flash memory 110 through a data bus DATA and a logical address bus. According to an exemplary embodiment, memory controller 620 may receive an address of data to read and/or to write from card interface 610 through a logical address bus, and transmit it to flash memory 110 through a physical address.

Memory controller 620 may also receive and/or transmit data to read and/or to write through a data bus connected to each of card interface 610 and flash memory 110. Memory controller 620 may perform an identical or similar function of memory controller 100 illustrated in FIG. 1. Accordingly, memory controller 620 may dynamically determine a write operation policy with a minimum cost through a sequential write operation.

In the at least one flash memory 110, various kinds of data may be stored. According to an exemplary embodiment, an address translation table 624 may be included in buffer memory 622. Address translation table 624 may include logical addresses received from the host and physical addresses for accessing flash memory 110. Memory controller 620 may write data in some area designated by some physical addresses and may update address translation table 624.

Memory controller 620 may select a physical address which may perform a read operation along with a write operation by referring to a physical address of data where a write operation is performed from address translation table 624. Memory controller 620 may perform the write operation and the read operation together and update address translation table 624 according to the write operation and the read operation. Accordingly, an operation time of electronic device 600 may be reduced.

When electronic device 600 of FIG. 14 is connected to a host such as a computer, a digital camera, a digital audio player, a cellular phone, a video game console or a digital set-top box, the host may transmit or receive data stored in the at least one flash memory 110 through card interface 610 and memory controller 620.

Figure 15:
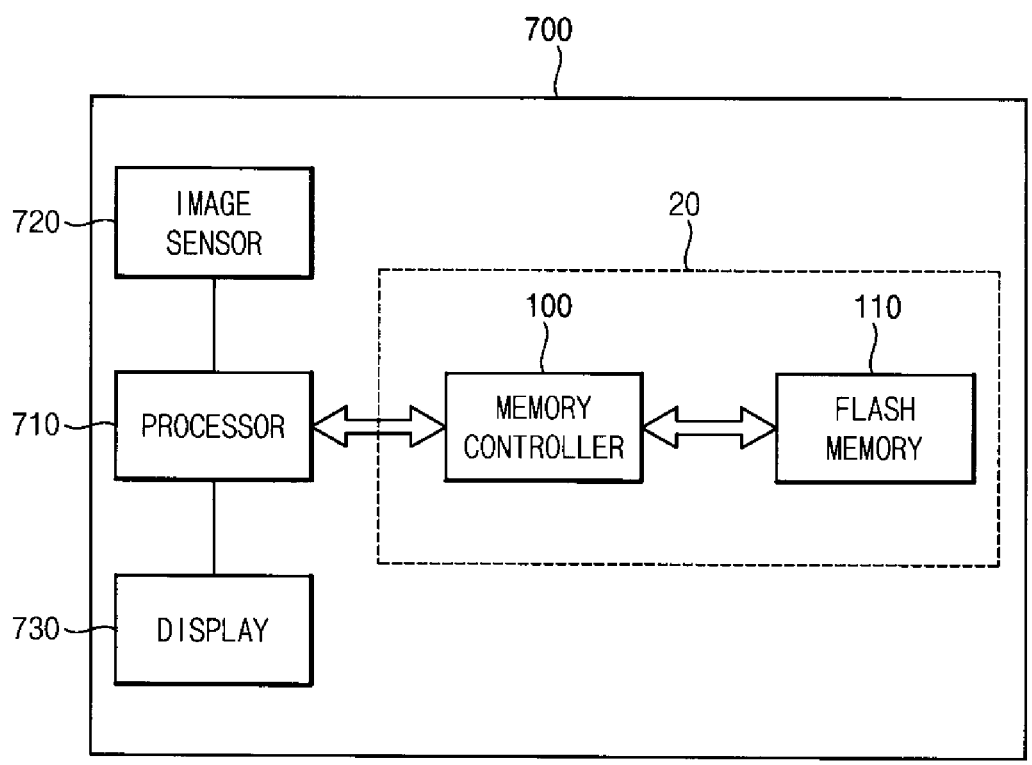
FIG. 15 is a block diagram illustrating an electronic device including the data storage device in FIG. 1 according to still another exemplary embodiment.

FIG. 15 is a block diagram illustrating an electronic device 700 including the data storage device in FIG. 1 according to still another exemplary embodiment.

Referring to FIG. 15, an electronic device 700 may include a processor 710, an image sensor 720, a display 730, and data storage device 20 having flash memory 110 and memory controller 100 which may control an operation of flash memory 110.

Processor 710 may control a general operation of electronic device 700. Memory controller 100 may be controlled by processor 710 to control a general operation of electronic device 700. For example, memory controller 100 may dynamically determine a write operation policy with a minimum cost through a sequential write operation under control of processor 710.

Image sensor 720 of electronic device 700 may convert an optical image into digital signals, and converted digital signals may be stored in flash memory 110 and/or displayed through display 730 under a control of processor 710. In addition, the digital signals stored in flash memory 110 may be displayed through display 730 under a control of processor 710.

As described above, a memory controller may dynamically determine a write operation policy with a minimum cost through a sequential write operation, and the performance of the write operation may be enhanced.

The above described embodiments may be used in any device or system including a flash-based SSD, such as a mobile phone, a smart phone, a PDA, a PMP, a digital camera, a digital television, a set-top box, a music player, a portable game console, a navigation device, a PC, a server computer, a workstation, a tablet computer, a laptop computer, a smart card, a printer, etc.

The foregoing is illustrative of embodiments and is not to be construed as limiting thereof. Although a few embodiments have been described, those skilled in the art will readily appreciate that many modifications are possible in the embodiments without materially departing from the scope of the inventive concept as set forth in the accompanying claims. Therefore, it is to be understood that the foregoing is illustrative of various embodiments and is not to be construed as limited to the specific embodiments disclosed, and that modifications to the disclosed embodiments, as well as other embodiments, are intended to be included within the scope of the claims.

What is claimed is:

1. A method of managing a data storage device including a memory controller and a memory device, the method comprising:
    for a write request received at the data storage device:
        calculating a first sequential and consecutive write cost (SCWC) according to a garbage collection (GC) write operation policy,
        calculating a second SCWC according to a slack space recycling (SSR) write operation policy, and
        calculating a third SCWC according to an in-place updating (IPU) write operation policy;
    determining a write operation policy which has a lowest cost among the first through third SCWCs; and
    writing data in a selected segment in the memory device according to the determined write operation policy,
    wherein the selected segment is selected by selecting at least one segment having a minimum valid space among a plurality of used segments of the memory device, and, when the at least one segment includes a plurality of segments, selecting as the selected segment a segment among the plurality of used segments having the minimum valid space which also has a largest consecutive invalid space.

2. The method of claim 1, wherein calculating the first SCWC comprises:
    calculating a valid page consecutive read time for each of one or more consecutive valid page clusters in the selected segment to calculate a segment valid page read time corresponding to a sum of the valid page consecutive read times;
    calculating a first consecutive write time for all valid pages in the selected segment;
    calculating a second consecutive write time for all invalid pages in the selected segment;
    calculating a meta data read time for all of the valid pages in the selected segment;
    calculating a meta data write time for all of the valid pages and the invalid pages in the selected segment; and
    determining a sum of the segment valid page read time, the first consecutive write time, the second consecutive write time, the meta data read time and the meta data write time as the first SCWC.

3. The method of claim 2, wherein the valid page consecutive read times and the first and second consecutive write times are calculated by referring to a device performance table storing a plurality of consecutive read times and a plurality of consecutive write times which are measured per a consecutive unit storage space.

4. The method of claim 3, wherein a consecutive read time or a consecutive read time which is not included in the device performance table is calculated by interpolating between adjacent consecutive read times or consecutive write times, respectively, included in the device performance table.

5. The method of claim 3, wherein the device performance table is filled by performing a device performance measuring algorithm when a storage space in the memory device is formatted, and the filled device performance table is stored in a super block in the storage space.

6. The method of claim 1, wherein calculating the second SCWC comprises:
    calculating an invalid page consecutive write time for each of one or more consecutive invalid page clusters in the selected segment to calculate a segment slack space write time corresponding to a sum of the invalid page consecutive write times;
    calculating a segment slack space meta data write time corresponding to a meta data write time for all of invalid pages in the selected segment; and
    determining a sum of the segment slack space write time and the segment slack space meta data write time as the second SCWC.

7. The method of claim 1, calculating the third SCWC comprises determining a sum of write times of each unit page of all invalid pages in the selected segment as the third SCWC.

8. A data storage device, comprising:
    a memory device; and
    a memory controller configured to control the memory device, the memory controller comprising a processor including a write operation module configured to perform a sequential and consecutive write operation when data is written in a selected segment in the memory device,
    wherein the write operation module comprises:
        a garbage collection (GC) cost calculation module configured to calculate a first sequential and consecutive write cost (SCWC) according to a GC write operation policy;
        a slack space recycling (SSR) cost calculation module configured to calculate a second SCWC according to a SSR write operation policy; and
        an in-place updating (IPU) cost calculation module configured to calculate a third SCWC according to an IPU write operation policy, and
    wherein the processor is configured to write the data in the selected segment according to a write operation policy which has a lowest cost among the first through third SCWCs, and
    wherein the GC cost calculation module is:
    configured to calculate a valid page consecutive read time for each of one or more consecutive valid page clusters in the selected segment to calculate a segment valid page read time corresponding to a sum of the valid page consecutive read times,
    configured to calculate a first consecutive write time for all valid pages in the selected segment,
    configured to calculate a second consecutive write time for all invalid pages in the selected segment,
    configured to calculate a meta data read time for all of the valid pages in the selected segment,
    configured to calculate a meta data write time for all of the valid pages and the invalid pages in the selected segment; and
    configured to determine a sum of the segment valid page read time, the first consecutive write time, the second consecutive write time, the meta data read time and the meta data write time as the first SCWC.

9. The data storage device of claim 8, wherein the memory controller further comprises a memory that includes a device performance table storing a plurality of consecutive read times and a plurality of consecutive write times which are measured per a consecutive unit storage space, and the write operation module is configured to calculate the valid page consecutive read times and the first and second consecutive write times by referring to the device performance table.

10. The data storage device of claim 9, wherein the write operation module calculates a consecutive read time or a consecutive read time which is not included in the device performance table by interpolating between adjacent consecutive read times or consecutive write times, respectively, included in the device performance table.

11. The data storage device of claim 8, wherein the SSR cost calculation module is: configured to calculate an invalid page consecutive write time for each of one or more consecutive invalid page clusters in the selected segment to calculate a segment slack space write time corresponding to a sum of the invalid page consecutive write times; configured to calculate a segment slack space meta data write time corresponding to a meta data write time for all invalid pages in the selected segment; and configured to determine a sum of the segment slack space write time and the segment slack space meta data write time as the second SCWC.

12. The data storage device of claim 8, wherein the IPU cost calculation module is configured to determine a sum of write times of each unit page of all invalid pages in the selected segment as the third SCWC.

13. The data storage device of claim 8, wherein the processor further comprises a victim selection module configured to select at least one segment having a minimum valid space among a plurality of used segments of the memory device, and further configured to select as the selected segment, when the at least one segment includes a plurality of segments, a segment among the plurality of used segments having the minimum valid space which also has a largest consecutive invalid space.

14. A method of operation of a data storage device including a memory device and a memory controller, the method comprising:
  receiving a write request at the data storage device;
  determining whether a free segment exists in the memory device;
  when a free segment does not exist in the memory device, selecting a victim segment in the memory device;
  determining a first sequential and consecutive write cost (SCWC) corresponding to writing data to the selected victim segment according to a garbage collection (GC) first write operation policy;
  determining a second SCWC corresponding to writing the data to the selected victim segment according to a slack space recycling (SSR) write operation policy;
  determining a third SCWC corresponding to writing the data to the selected victim segment according to an in-place updating (IPU) write operation policy;
  selecting a write operation policy among the GC, SSR and IPU write operation policies which has a lowest corresponding cost among the first through third SCWCs; and
  writing the data to the selected victim segment in the memory device via the memory controller according to the selected write operation policy,
  wherein in the GC write operation policy data stored in the selected victim segment is copied to another, different, segment for allowing the selected victim segment to be rewritten to,
  wherein in the SSR write operation policy the data is consecutively written in slack spaces in the selected victim segment according to physical orderings in the selected victim segment, and
  wherein in the IPU write operation policy the data is randomly written in invalid page clusters of the selected victim segment.

15. The method of claim 14, wherein selecting the victim segment comprises:
  searching among a plurality of used segments of the memory device for one or more used segments each having a minimum valid space;
  when there is exactly one used segment having the minimum valid space, selecting the one used segment having the minimum valid space as the victim segment; and
  when there are more than one used segments having the minimum valid space, selecting as the victim segment a one of the used segments having the minimum valid space which also has a largest sequential invalid storage space.

16. The method of claim 14, wherein determining each of the first, second, and third SCWCs comprises accessing performance data stored in a device performance table, wherein the performance data comprises valid page sequential read times, valid page sequential write times, invalid page sequential write times, meta data read times, and meta data write times for each of a plurality of sequential data units for the memory device.

17. The method of claim 16, further comprising:
  measuring the performance data for the memory device;
  storing the performance data in the memory device when the memory device is formatted; and
  when the memory device is mounted, reading the performance data from the memory device and storing the performance data in the device performance table in a second, separate, memory device of the memory controller.

* * * * *